July 4, 1939.  H. AYLIFFE  2,164,373
GARDEN TOOL
Filed April 11, 1938
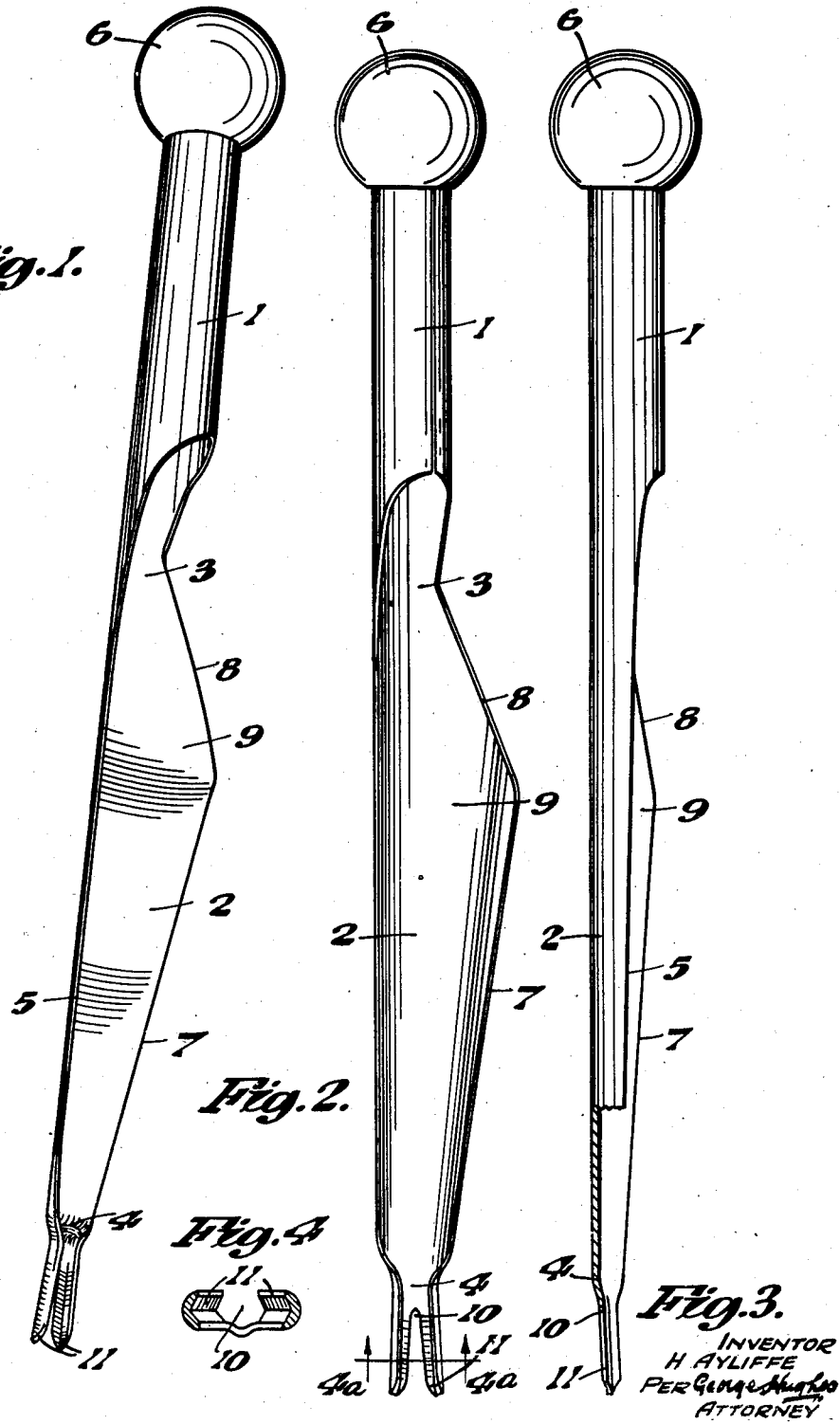
INVENTOR
H. AYLIFFE Patented July 4, 1939

2,164,373

UNITED STATES PATENT OFFICE 2,164,373

GARDEN TOOL

Harry Ayliffe, London, England

Application April 11, 1938, Serial No. 201,383
In Great Britain February 15, 1937

1 Claim. (Cl. 55—65)

The present invention relates to an improved gardening device by means of which weeding operations can be readily effected and also other useful operations. The object of this invention is to provide a device which is cheap and simple to manufacture but yet can be used for a number of purposes, e. g., for insertion in the ground for removing weeds, for making holes for planting bulbs or seeds or plants, and for trenching purposes and to act as a trowel for potting and like purposes.

According to this invention the gardening implement comprises broadly a metal plate of arcuate or channel section tapered towards one end and bifurcated at such end, and formed with a handle at its other end.

The preferred form of my invention comprises a substantially triangular strip of sheet metal with an integral extension at one end bent into a tubular handle, and tapered nearly to a point at its other end, the latter end being the apex of the triangle and being bifurcated, and the metal between the handle and the bifurcated end being channelled or arcuate in cross section and adapted to function as a trowel or like implement.

In order that this invention may be clearly understood and readily carried into effect a sheet of drawings is appended hereto illustrating an embodiment thereof, and wherein, Fig. 1 is a perspective view looking at the recessed side of the tool.

Fig. 2 is a face view of the recessed side.

Fig. 3 is a part sectional end elevation, and

Fig. 4 is a detail section to a larger scale on the line 4ª—4ª of Fig. 2.

Referring to the drawing the garden implement shown is produced from sheet metal stamped into blanks each of which blanks can comprise an oblong part adapted to be rolled to form a tubular handle I and a substantially triangular part 2 united by a neck 3 to the tubular part I and bent to a shallow curved section the apex of the triangle (i. e., the lower end of the tool) being blunt and being split for a short distance to form a bifurcation 4. One edge 5 of the triangular part is a longitudinal edge substantially parallel with the axis of the handle part I, the other edge being inclined in relation thereto.

The oblong part adapted to form the tubular handle I can be bent around any suitable tool and when made into cylindrical form can have plugged into one end a knob 6 to facilitate the handling thereof. The substantially triangular part is adapted to function as a trowel and is particularly useful when potting plants. The inclined edge 7 of the triangular body part is cut away at an angle inwardly towards the handle as at 8 so that the widest part 9 of the arcuate section is between the handle and the apex of the trowellike body part. The bifurcation at the said apex can be effected by splitting the end of the device for a short distance, e. g., about three quarters of an inch and the inner end of the split is rounded as at 10 to prevent further unintentional splitting, and the two limbs formed by the split are each pressed or otherwise treated so as to make them of arcuate or channel section and they are bent in such manner that their channelled faces are substantially opposed to each other as shown more clearly in Fig. 4. The free ends of the two limbs are suitably pointed, the points preferably being of wide V form as indicated at II.

The total length of the device may vary, but a convenient length is about ten inches, and the maximum width of the trowellike part can be about one and a half inches. With such dimensions the tubular part forming the handle can be about two and a half to three inches long.

The bifurcated end is particularly suitable for removing weeds, and also the particular shape of the devices enables holes to be readily formed in the ground for planting seeds or bulbs, a hole being formed by pushing the device in the ground and rotating it. Also the device can be used as a trencher to form trenches to receive seeds by forcing the point into the ground two to three inches and dragging the tool at an angle face downwards along the ground.

The device is also suitable for use as a trowel because the winglike part formed by the arcuate section triangular body part is shaped substantially after the manner of a trowel.

I claim:

A weeder and trowel comprising a substantially triangular plate of metal of channel section, a pair of narrowly spaced pointed limbs forming one extremity of the tool and also the junction of two converging edges of the substantially triangular plate, a handle extending from the substantially triangular plate and comprising the other end of the tool, one side of the plate having a substantially wide V shaped edge constituted by two sides of the triangle.

HARRY AYLIFFE.